US012561803B2

(12) United States Patent
Quan et al.

(10) Patent No.: US 12,561,803 B2
(45) Date of Patent: Feb. 24, 2026

(54) METHOD FOR PREDICTING MICROSATELLITE INSTABILITY (MSI) FROM WHOLE SLIDE IMAGE BASED ON SELF-ATTENTION MECHANISM

(71) Applicant: SHANGHAI TONGSHU BIOLOGY SCIENCE AND TECHNOLOGY CO., LTD., Baoshan District (CN)

(72) Inventors: Xueping Quan, Shanghai (CN); Linghua Yan, Shanghai (CN)

(73) Assignee: Wuxi Tongshu Biotechnology Co., Ltd., Shanghai (CN)

( * ) Notice: Subject to any disclaimer, the term of this patent is extended or adjusted under 35 U.S.C. 154(b) by 280 days.

(21) Appl. No.: 18/266,631

(22) PCT Filed: Aug. 23, 2022

(86) PCT No.: PCT/CN2022/114073
§ 371 (c)(1),
(2) Date: Jun. 12, 2023

(87) PCT Pub. No.: WO2023/035926
PCT Pub. Date: Mar. 16, 2023

(65) Prior Publication Data
US 2024/0046460 A1 Feb. 8, 2024

(30) Foreign Application Priority Data
Sep. 7, 2021 (CN) .......................... 202111043099.X

(51) Int. Cl.
*G06V 10/764* (2022.01)
*G01N 1/30* (2006.01)
(Continued)

(52) U.S. Cl.
CPC ............. *G06T 7/0012* (2013.01); *G01N 1/30* (2013.01); *G06T 7/11* (2017.01); *G06V 10/44* (2022.01);
(Continued)

(58) Field of Classification Search
CPC .......... G06N 3/045; G06N 3/08; G06N 3/048; G06N 20/10; G06N 3/0464; G06N 3/084;
(Continued)

(56) References Cited

U.S. PATENT DOCUMENTS

| 11,741,365 B2 * | 8/2023 | Khan | G06N 3/0464 |
| | | | 706/25 |
| 12,254,684 B2 * | 3/2025 | Wang | G06N 3/094 |

(Continued)

FOREIGN PATENT DOCUMENTS

| AU | 2019328344 A1 * | 4/2021 | G16B 40/20 |

*Primary Examiner* — Tsung Yin Tsai
(74) *Attorney, Agent, or Firm* — Barclay Damon LLP

(57) ABSTRACT

A method for predicting a microsatellite instability (MSI) from a whole slide image based on a self-attention mechanism, in which an image of a tissue region obtained through cellular staining on a tissue sample of a patient serves as a target whole slide image to be predicted. The tissue region is segmented into tissue patches, and stain normalization is performed with staintools. N tumor patches are screened out from the tissue patches, and the N tumor patches are inputted to a preset feature extraction model. Each of the tumor patches are encoded as an M-dimensional feature vector, thereby obtaining a N×M feature matrix; and the N×M feature matrix is inputted to a pre-trained prediction model, such that the prediction model outputs an MSI score of the target whole slide image. The present disclosure predicts the MSI based on deep learning and the cellular staining.

20 Claims, 6 Drawing Sheets

(51) Int. Cl.

| | |
|---|---|
| *G06T 7/00* | (2017.01) |
| *G06T 7/11* | (2017.01) |
| *G06V 10/44* | (2022.01) |

(52) U.S. Cl.
CPC .. *G06V 10/764* (2022.01); *G06T 2207/20081* (2013.01); *G06T 2207/30096* (2013.01)

(58) Field of Classification Search
CPC ............ G06N 5/02; G06T 2207/20081; G06T 2207/20084; G06T 2207/30096; G06T 2207/10056; G06T 7/0012; G06T 2207/20021; G06T 2207/30024; G06T 11/00; G06T 2207/30061; G06T 2207/30081; G06T 7/11; G06T 7/50; G06T 2207/10024; G06T 7/0014; G06T 7/194; G06V 20/695; G06V 20/698; G06V 10/82; G06V 10/764; G06V 10/7715; G06V 10/44; G06V 10/766; G06V 10/774; G06V 10/7747; G06V 10/70; G06V 20/70; G06V 2201/03; G16B 40/20; G16B 30/10; G16B 20/20; G16B 30/20; G16B 20/10; G16B 40/00; G16B 40/10; G16B 50/10; G16B 50/20; G16B 50/30; G16B 20/30; G16B 25/10; G16B 45/00; G16B 15/30; G16B 20/00; G16H 30/40; G16H 50/20; G16H 50/70; G16H 10/40; G16H 10/60; G16H 50/30; G16H 70/60; G16H 30/00; Y02A 90/10; C12Q 1/6886; C12Q 1/6869; C12Q 2525/151; G01N 1/30; G01N 33/50; G06F 18/241; G06F 16/2272; G06F 16/24578; G06F 17/18; G06F 9/3004; G06F 16/532; G06F 18/214; G06F 18/24323

See application file for complete search history.

(56) References Cited

U.S. PATENT DOCUMENTS

| | | | | |
|---|---|---|---|---|
| 2019/0347557 A1* | 11/2019 | Khan | .................... | G06N 3/048 |
| 2021/0319907 A1* | 10/2021 | Harley | ................ | G06N 3/0464 |
| 2021/0373024 A1* | 12/2021 | Shanmugam | .... | G01N 33/57419 |
| 2022/0343638 A1* | 10/2022 | Wang | .................... | G16H 30/40 |

* cited by examiner

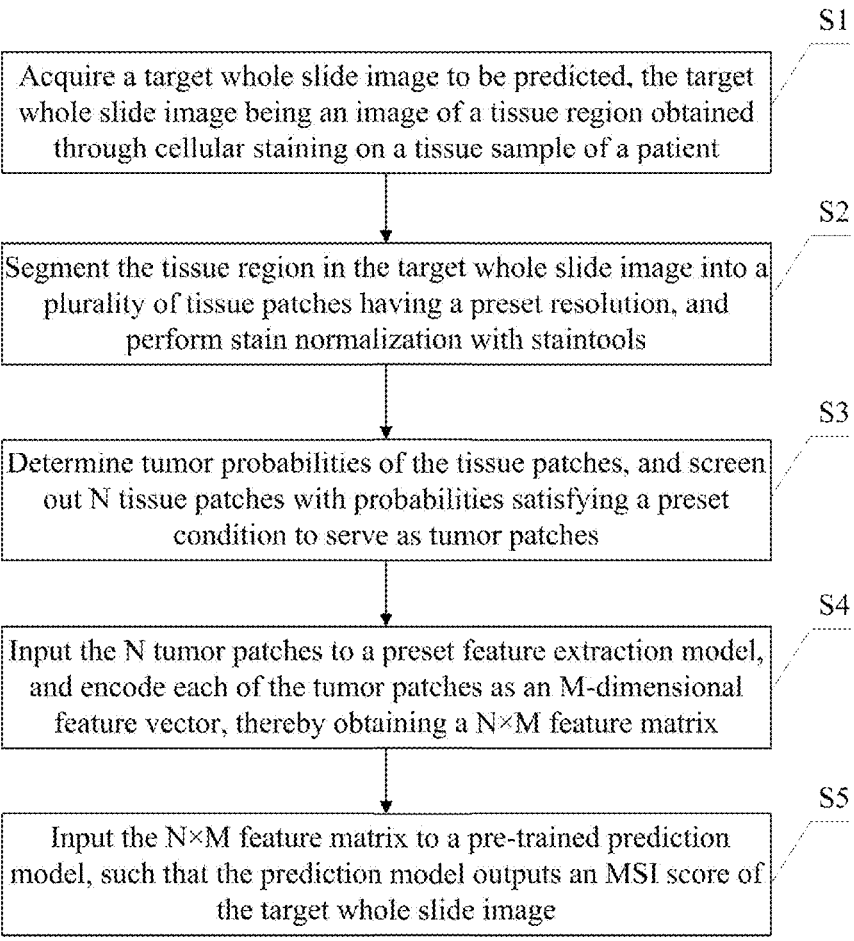

S1

Acquire a target whole slide image to be predicted, the target whole slide image being an image of a tissue region obtained through cellular staining on a tissue sample of a patient

S2

Segment the tissue region in the target whole slide image into a plurality of tissue patches having a preset resolution, and perform stain normalization with staintools

S3

Determine tumor probabilities of the tissue patches, and screen out N tissue patches with probabilities satisfying a preset condition to serve as tumor patches

S4

Input the N tumor patches to a preset feature extraction model, and encode each of the tumor patches as an M-dimensional feature vector, thereby obtaining a N×M feature matrix

S5

Input the N×M feature matrix to a pre-trained prediction model, such that the prediction model outputs an MSI score of the target whole slide image

FIG. 2

METHOD FOR PREDICTING MICROSATELLITE INSTABILITY (MSI) FROM WHOLE SLIDE IMAGE BASED ON SELF-ATTENTION MECHANISM

CROSS REFERENCE TO RELATED APPLICATION

The present application is a national phase application claiming priority from PCT Application No. PCT/CN2022/114073 having a filing date of Aug. 23, 2022, which claims priority to the Chinese Patent Application No. 202111043099.X, filed with the China National Intellectual Property Administration (CNIPA) on Sep. 7, 2021, and entitled "METHOD FOR PREDICTING MICROSATEL-LITE INSTABILITY (MSI) FROM WHOLE SLIDE IMAGE BASED ON SELF-ATTENTION MECHANISM", each of which is incorporated herein by reference in its entirety.

TECHNICAL FIELD

The present disclosure relates to the technical field of medical image information processing in computers, and in particular to a method for predicting an MSI from a whole slide image based on a self-attention mechanism, an electronic device and a computer-readable storage medium.

BACKGROUND

Microsatellite instability (MSI) refers to an increase or loss of simple repeated sequences caused by the mismatch repair (MMR) or replication error (RER), and results in length alterations of microsatellites. Defective genes in MMR cannot work normally to correct the RER and cause alterations of deoxyribonucleic acids (DNAs) of microsat-ellites. This is the main reason of the MSI. The MSI is prone to cell proliferation and prosoplasia, or even activation of malignant tumors. Microsatellites in tumors are more likely to cause the length alterations than normal tissues. Evi-dences indicate that the MSI is closely associated with colorectal cancers, gastric cancers, endometrial cancers and other tumors. About 15% of sporadic colorectal cancers and at least 90% of hereditary nonpolyposis colorectal cancers (HNPCCs, also referred to as Lynch symdromes) are linked with the MSI. Hence, it is of great significance to clinically conduct MSI detection. The MSI can be classified into three types according to the frequency: high MSI (MSI-H), low MSI (MSI-L), and microsatellite stability (MSS). By con-ducting MSI analysis on pathological images of tissue samples from patients, MSI scores are obtained, and then the MSI types are determined.

Referring to FIG. 1, a method for acquiring an MSI score of a tissue sample of a patient is provided in the prior art. The method includes the following steps:

A: A whole slide image of a patient is acquired, a blank region of the image is removed, and a tissue region of the whole slide image is screened out.

B: A screened tissue region is segmented, and stain normalization is performed with staintools to obtain all patches (having a resolution of 256×256) of the tissue region.

C: A dataset formed by 100,000 non-overlapping histo-logical patches is used to train a classification model (ResNet34). All patches obtained in the above step are resized to 224×224, and input to the model for tissue-type classification, thereby obtaining types of the patches. There are the following tissue types: adipose (ADI), background (BACK), debris (DEB), lympho-cytes (LYM), mucus (MUC), smooth muscle (MUS), normal colon mucosa (NORM), cancer-associated stroma (STR), and colorectal adenocarcinoma epithe-lium (TUM).

D: Only coordinates of tumor regions are selected and labeled on the original whole slide image.

E: All labeled regions are re-segmented, and stain nor-malization is performed with the staintools to obtain patches having a resolution of 512×512.

F: All patches obtained in the above step are resized to 224×224, and input to a classification model (Mobile-Net_v2) to obtain MSI scores of the patches.

G: The MSI scores of the patches of the whole slide image are averaged to obtain an MSI result of the patient.

Both ResNet and MobileNet are convolutional neural networks (CNN) models. They have been universally applied to computer vision, with a desirable classification accuracy in ImageNet. However, the whole slide image is different from an ordinary image which can be directly input to the model for training. There are many whole slide images with a resolution of 10,000×10,000. The whole slide image is segmented into patches before entering the model in the above method. In this case, a feature map obtained by the CNN model only contains one in thousands of features on the whole slide image. In subsequent processing, the model considers that all patches have the same weight, and directly takes an average of the MSI scores of the patches as a final result. As a consequence, differences between features from the patches are not taken into account, meaning that patches actually having significant influences on the result and patches actually having no influences on the result share a same influencing factor, and the features are quantitatively analyzed under the same weight. This will affect the accu-racy of the result.

SUMMARY

An objective of the present disclosure is to provide a method for predicting an MSI from a whole slide image based on a self-attention mechanism, an electronic device and a computer-readable storage medium each implement-ing the method. By screening out tumor patches for feature encoding, and performing classification and prediction with a self-attention algorithm, the present disclosure improves an accuracy of MSI prediction.

To achieve the above-mentioned objective, the present disclosure provides a method for predicting an MSI from a whole slide image based on a self-attention mechanism, including the following steps:

S1: acquiring a target whole slide image to be predicted, the target whole slide image being an image of a tissue region obtained through cellular staining on a tissue sample of a patient;

S2: segmenting the tissue region in the target whole slide image into a plurality of tissue patches having a preset resolution, and performing stain normalization with staintools;

S3: determining tumor probabilities of the tissue patches, and screening out N tissue patches with probabilities satisfying a preset condition to serve as tumor patches;

S4: inputting the N tumor patches to a preset feature extraction model, and encoding each of the tumor patches as an M-dimensional feature vector, thereby obtaining a N×M feature matrix; and

S5: inputting the N×M feature matrix to a pre-trained prediction model, such that the prediction model outputs an MSI score of the target whole slide image, where the prediction model is a model obtained by training a self-attention model based on a first sample set, and the first sample set includes a feature matrix of a pathological sample image and an MSI score corresponding to the pathological sample image.

Further, a method that the prediction model predicts the MSI score of the target whole slide image in step S5 includes:

S51: transforming the M-dimensional feature vector corresponding to the tumor patch into a low-dimensional feature vector;

S52: performing attention pooling on the low-dimensional feature vector corresponding to the tumor patch to obtain a weight of the tumor patch;

S53: seeking a weighted sum for low-dimensional feature vectors corresponding to all of the tumor patches to obtain a low-dimensional feature vector of the whole target whole slide image; and S54: mapping the low-dimensional feature vector of the whole target whole slide image to a classification space, and performing softmax activation to obtain the MSI score.

Further, the M-dimensional feature vector is a 1,024-dimensional vector, and the low-dimensional feature vector is a 512-dimensional vector.

Further, in step S51, the M-dimensional feature vector corresponding to the tumor patch is transformed into the low-dimensional feature vector by:

$$h_k = \text{ReLU}(W_2(\text{ReLU}(W_1 Z_k + b_1)) + b_2)$$

where, $Z_k$ denotes an M-dimensional feature vector of a kth tumor patch, $h_k$ denotes a low-dimensional feature vector of the kth tumor patch, $W_1$ and $W_2$ denote a weight parameter of a first fully-connected (FC) layer, and $b_1$ and $b_2$ denote a deviation parameter of the first FC layer. Further, in step S51, the weight of the tumor patch is obtained by:

$$a_k = \frac{\exp\{W_a(\tanh(V h_k + c) \odot sigm(U h_k + d))\}}{\sum_{j=1}^{N} \exp\{W_a(\tanh(V h_j + c) \odot sigm(U h_j + d))\}}$$

where, $a_k$ denotes a weight of a kth tumor patch, V and U denote a weight parameter of a second FC layer, c and d denote a deviation parameter of the second FC layer, and $h_k$ denotes a low-dimensional feature vector of the kth tumor patch.

Further, in step S54, the MSI score is obtained by:

$$p = \text{softmax}(W_{cls} h_{slide} + b_{cls})$$

where, p denotes the MSI score, $W_{cls}$ denotes a weight parameter of a third FC layer, $b_{cls}$ denotes a deviation parameter of the third FC layer, and $h_{slide}$ denotes the low-dimensional feature vector of the whole target whole slide image.

Further, the feature extraction model is a CNN model with a VGGNet, AlexNet, InceptionNet or ResNet architecture.

Further, the feature extraction model uses a ResNet50 model.

Further, the determining tumor probabilities of the tissue patches in step S3 includes:

inputting the tissue patches obtained in step S2 to a pre-trained classification model, such that the classifi-
cation model outputs the tumor probabilities and normal probabilities of the tissue patches, where the classification model is a model obtained by training CNN based on a second sample set, and the second sample set includes a plurality of tumor patches and a plurality of normal patches randomly selected from the pathological sample image.

Further, the classification model uses a ResNet18 model.

To achieve the above-mentioned objective, the present disclosure further provides an electronic device, including a processor, a communication interface, a memory, and a communication bus, where the processor, the communication interface, and the memory communicate with each other through the communication bus;

the memory is configured to store a computer program; and the processor is configured to execute the program in the memory to implement steps of the method for predicting an MSI from a whole slide image based on a self-attention mechanism.

To achieve the above-mentioned objective, the present disclosure further provides a computer-readable storage medium, where the computer-readable storage medium stores a computer program, and the computer program is executed by a processor to implement steps of the method for predicting an MSI from a whole slide image based on a self-attention mechanism.

Compared with the prior art, the present disclosure has the following advantages:

The present disclosure predicts the MSI based on deep learning and cellular staining. The method includes the steps of obtaining an image of a tissue region through cellular staining on a tissue sample of a patient to serve as a target whole slide image to be predicted, segmenting the tissue region into tissue patches, and performing stain normalization with staintools; screening out N tumor patches from the tissue patches, and inputting the N tumor patches to a preset feature extraction model; encoding each of the tumor patches as an M-dimensional feature vector, thereby obtaining a N×M feature matrix; and inputting the N×M feature matrix to a pre-trained prediction model, such that the prediction model outputs an MSI score of the target whole slide image. The feature vectors of the tumor patches in the whole slide image are acquired to form the feature matrix, and the feature matrix is input to a self-attention model for prediction. The resulting MSI score takes into account an influence of each tumor patch on the whole target whole slide image. Therefore, the resulting feature mapping of the self-attention model is more accurate, and the MSI prediction has a higher accuracy.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. A person of ordinary skill in the art may further obtain other accompanying drawings based on these accompanying drawings without creative labor.

FIG. 2 is a flowchart of a method for predicting an MSI from a whole slide image based on a self-attention mechanism according to an embodiment of the present disclosure;

DETAILED DESCRIPTION OF THE EMBODIMENTS

Figure 1:
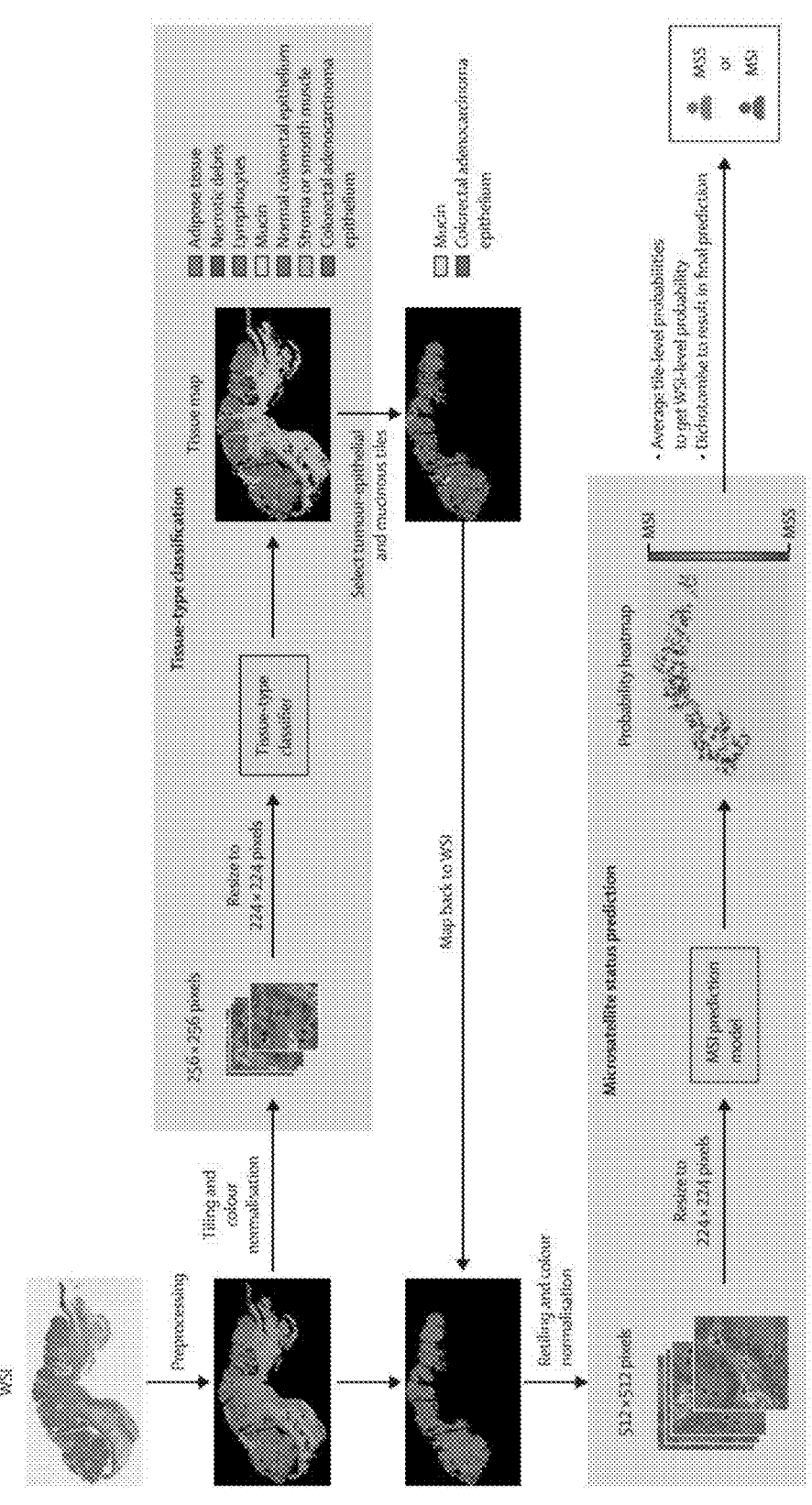
FIG. 1 is a schematic view of a method for predicting an MSI in accordance with the prior art.

The present disclosure will be described in further detail below with reference to the accompanying drawings and specific embodiments. The advantages and features of the present disclosure will become more apparent from the following descriptions. It should be noted that the drawings are simplified and do not use an accurate proportion, that is, the drawings are only intended to conveniently and clearly assist in illustrating the implementations of the present disclosure. To make the objectives, features and advantages of the present disclosure clearer, the specific implementations of the present disclosure are described in detail below with reference to the drawings. The structure, scale, size, and the like shown in the drawings of this specification are only used to match the content disclosed in the specification and for those skilled in the art to understand and read, which are not used to limit the limitations for implementing the present disclosure and thus are not technically substantial. Any structural modification, scaling relation change, or size adjustment made without affecting the effects and objectives that can be achieved by the present disclosure should fall within the scope that can be encompassed by the technical content disclosed in the present disclosure.

CNN is a type of feedforward neural network with convolution computations and deep structures, and is one of typical algorithms in deep learning. For a CNN model, features are extracted through a convolution operation of a convolution kernel. Pooling is performed through a down-sampling layer to reduce a dimensionality of data. The data is nonlinearly mapped to a next feature space through an FC layer and an activation operation. The above process is repeated, and a final classification result is obtained by full connection. The method is desirable for an ordinary image (generally having a resolution of less than 1,000×1,000). However, due to a huge resolution, the whole slide image cannot be directly input to the CNN model, and therefore is to be segmented. The region with a large influencing factor is distributed widely but still has a small area relative to the whole image, which results in significantly different data carried by patches. For the whole slide image, the accuracy of the model will be seriously affected if all patches use the same weight.

The present disclosure has the following core concept: A whole slide image is segmented into non-overlapping patches having a preset resolution. Tumor patches are screened out. Each patch in red, green and blue (RGB) format is encoded into an M-dimensional feature vector through a pre-trained feature extraction model. A weight of the patch is obtained through an attention mechanism, thereby obtaining an MSI score of the whole slide image. The present disclosure computes an attention of each patch through the carried feature, thereby obtaining a weight of the patch. The resulting pathological feature takes into account an influence of each patch on the whole target whole slide image. Therefore, the resulting feature mapping is more accurate, and the MSI prediction has a higher accuracy.

As shown in FIG. 2, the present disclosure provides a method for predicting an MSI from a whole slide image based on a self-attention mechanism, including the following steps:

Step S1: Acquire a target whole slide image to be predicted, the target whole slide image being an image of a tissue region obtained through cellular staining on a tissue sample of a patient.

In the above step, the pathological section prepared with a tissue sample from a specific site of the patient is subjected to cellular staining, and imaged under a microscope (such as a 40-fold microscope), thereby obtaining the whole slide image. The patient may be a patient to be diagnosed, and may also be a patient diagnosed with cancer, including but not limited to rectal cancer, gastric cancer and pancreatic cancer. The cellular staining may be hemotoxylin eosin (HE) staining, pap staining, Wright-Giemsa staining, etc. The HE staining is preferably used for its desirable transparency, striking contrast between nucleus and cytoplasm, and stable effect. For the sake of a better whole slide image, the tissue sample of the patient may further be preprocessed beside the cellular staining, which is not limited by the present disclosure herein.

Step S2: Segment the tissue region in the target whole slide image into a plurality of tissue patches having a preset resolution, and perform stain normalization with staintools.

In the above step, the tissue region is labeled in the target whole slide image. The specific labeling method may refer to the prior art. The labeled tissue region is segmented into a plurality of non-overlapping tissue patches according to the preset resolution. For example, the preset resolution is 512×512 pixels, namely the tissue region is segmented into 512×512 patches. The stain normalization is performed on each tissue patch with staintools, which prevents uneven staining and different color shades of the tissue patch and ensures the accuracy of subsequent image recognition and feature extraction.

Step S3: Determine tumor probabilities of the tissue patches, and screen out N tissue patches with probabilities satisfying a preset condition to serve as tumor patches.

In the above step, the tissue patches into which the tissue region is segmented include tumor patches and normal patches. The tumor patches are screened out, so as to subsequently perform feature extraction on the tumor patches and predict an MSI score.

Specifically, in an implementation, tissue types of the tissue patches are classified with a CNN model. That is, the tissue patches obtained in Step S2 are input to a pre-trained classification model, such that the classification model outputs the tumor probabilities and normal probabilities of the tissue patches. The classification model is a model obtained by training CNN based on a second sample set. The second sample set includes a plurality of tumor patches and a plurality of normal patches randomly selected from the pathological sample image.

After the tumor probabilities of the tissue patches are obtained, patches having tumor probabilities of greater than or equal to a preset threshold can be screened out to serve as the tumor patches. The preset threshold may be set according to an actual condition. For example, if the preset threshold is set as 0.5, namely all patches having tumor probabilities of greater than or equal to 0.5 serve as the tumor patches. Other conditions may also be used for screening. It is assumed that there are N tumor patches screened out in total. So far, the screening work on the tumor patches are completed.

Figure 3:
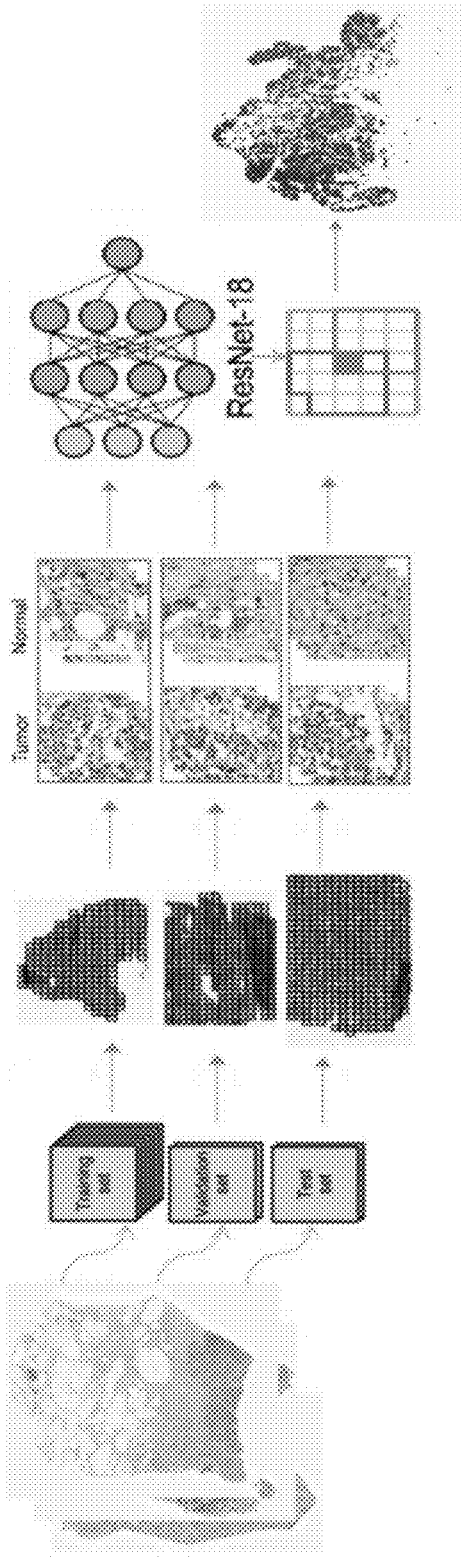
FIG. 3 illustrates a training process of a classification model for a tumor patch according to an embodiment of the present disclosure.

Optionally, the classification model may use a ResNet18 model. Referring to FIG. 3, the classification model is trained as follows:

a. A plurality of pathological sample images (40-fold microscope) are selected for tumor region labeling. These pathological sample images come from MSS and MSI-H tissue samples. In each type, there are 300 images for example.

b. The plurality of pathological sample images are divided into a training set, a validation set and a test set. For example, there are 70% of the pathological sample images in the training set, 10% of the pathological sample images in the validation set, and 20% of the pathological sample images in the test set.

c. For each pathological sample image, a tissue region is labeled and segmented into patches having a preset resolution (such as 512×512). The patches are divided into a tumor set and a normal set, and subjected to stain normalization with staintools.

d. Tumor patches and normal patches in the training set are trained with a ResNet18 model (for example, for each pathological section in the training set, 100 tumor patches and 100 normal patches are randomly selected at most).

e. The model is optimized through the validation set. A weight of the model is stored in case of a minimum loss.

f. When the loss of the validation set is not reduced for continuous preset rounds (such as 40 rounds), and the number of training rounds is greater than a preset number of rounds (such as 100 rounds), the training is stopped.

g. An accuracy, a recall rate and an area under the curve (AUC) of the model are counted with the test set. At last, the accuracy of the test set can reach at least 99%.

It is to be understood that the classification model is not limited to the ResNet18 model, and may also be other models capable of implementing the classification, which is not limited by the preset disclosure herein.

Step S4: Input the N tumor patches to a preset feature extraction model, and encode each of the tumor patches as an M-dimensional feature vector, thereby obtaining a N×M feature matrix.

Figure 4:
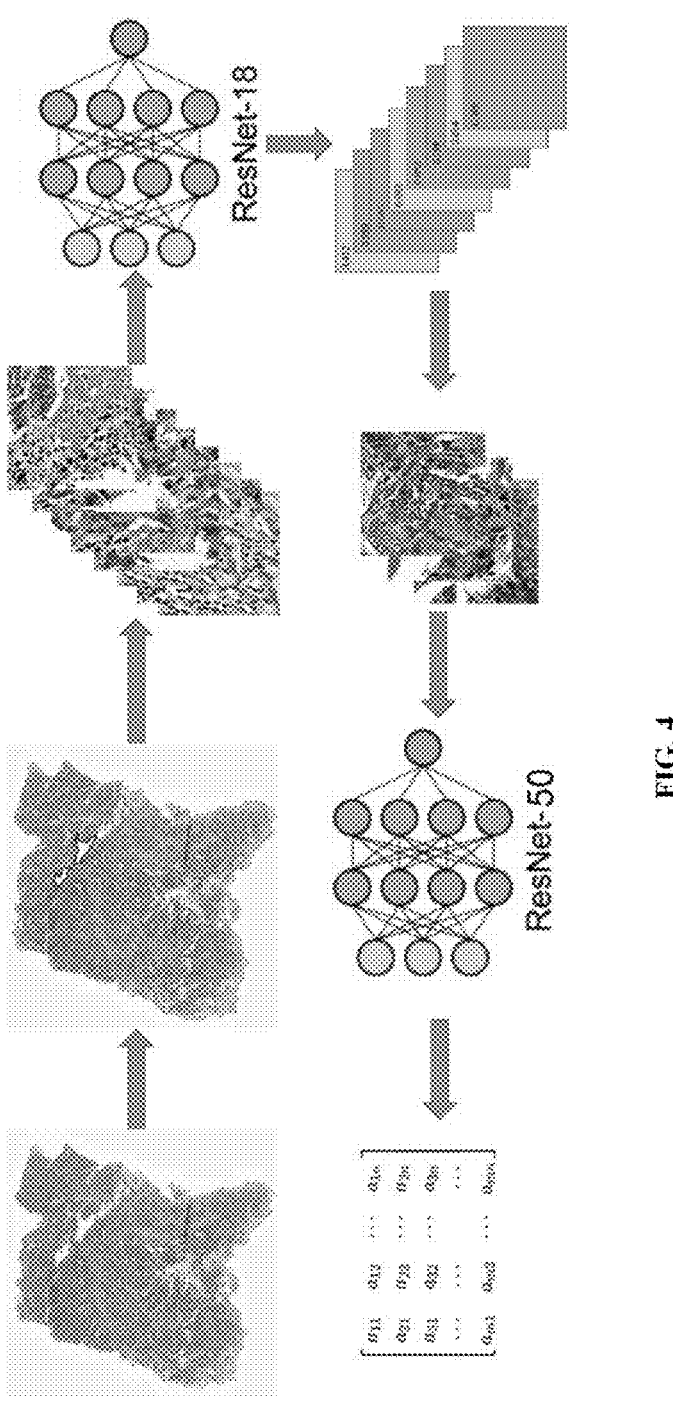
FIG. 4 illustrates a process for generating a feature matrix according to an embodiment of the present disclosure.

As shown in FIG. 4, the feature extraction model is used to extract relevant features from the image, and may be a ResNet50 model pre-trained with ImageNet. ImageNet is a recognition program in the computer vision system. The dataset of the program includes at least 14 million images, in which 1.2 million images are divided into 1,000 types. The pre-trained model has a set of desirable weights upon completion of the training, which are shared by the researcher for use.

In the embodiment, each tumor patch is preferably encoded as a 1,024-dimensional feature vector, thereby obtaining a N×1,024 feature matrix. In this way, the training can be performed in the low-dimensional feature space, rather than an ultra-large pixel space, to greatly reduce the computational burden.

In addition, the feature extraction model may further use other CNN models, such as VGGNet, AlexNet, Inception-Net, and ResNet, to generate feature vectors having the same dimensions (1,024 dimensions) or different dimensions.

So far, the feature extraction on the tumor patches are completed.

Step S5: Input the N×M feature matrix to a pre-trained prediction model, such that the prediction model outputs an MSI score of the target whole slide image.

The prediction model is a model obtained by training a self-attention model based on a first sample set. The first sample set includes a feature matrix of a pathological sample image and an MSI score corresponding to the pathological sample image.

The self-attention mechanism, also referred to as an internal attention mechanism, is intended to associate with different sites of single sequences to compute a representation of a same sequence. The weight alignment to be learned focuses on each part of the whole input image. It is very useful in machine reading, abstracting or image description. Specifically, in the present disclosure, a method that the prediction model based on the self-attention mechanism predicts the MSI score of the target whole slide image includes:

S51: Transform the M-dimensional feature vector corresponding to the tumor patch into a low-dimensional feature vector. The specific expression is given by:

$$h_k = \text{ReLU}(W_2(\text{ReLU}(W_1 Z_k + b_1)) + b_2)$$

In the foregoing Eq., $Z_k$ denotes an M-dimensional feature vector of a kth tumor patch, $h_k$ denotes a low-dimensional feature vector of the kth tumor patch, $W_1$ and $W_2$ denote a weight parameter of a first FC layer, and $b_1$ and $b_2$ denote a deviation parameter of the first FC layer.

Exemplarily, the M-dimensional feature vector may be a 1,024-dimensional vector, and the low-dimensional feature vector may be a 512-dimensional vector.

S52: Perform attention pooling on the low-dimensional feature vector corresponding to the tumor patch to obtain a weight of the tumor patch. The specific expression is given by:

$$a_k = \frac{\exp\{W_a(\tanh(V h_k + c) \odot sigm(U h_k + d))\}}{\sum_{j=1}^{N} \exp\{W_a(\tanh(V h_j + c) \odot sigm(U h_j + d))\}}$$

In the foregoing Eq., $a_k$ denotes a weight of a kth tumor patch, $h_j$ denotes a weight of a jth tumor patch, j=1, 2 . . . , N, V and U denote a weight parameter of a second FC layer, and c and d denote a deviation parameter of the second FC layer.

S53: Seek a weighted sum for low-dimensional feature vectors corresponding to all of the tumor patches to obtain a low-dimensional feature vector of the whole target whole slide image. The specific expression is given by:

$$h_{slide} = \Sigma_{k=1}^{N} a_k \odot h_k$$

In the foregoing Eq., $h_{slide}$ denotes the low-dimensional feature vector of the whole target whole slide image.

S54: Map the low-dimensional feature vector of the whole target whole slide image to a classification space, and perform softmax activation to obtain the MSI score. The specific expression is given by:

$$p = \text{softmax}(W_{cls} h_{slide} + b_{cls})$$

In the foregoing Eq., p denotes the MSI score, $W_{cls}$ denotes a weight parameter of a third FC layer, and $b_{cls}$ denotes a deviation parameter of the third FC layer.

Figure 5:
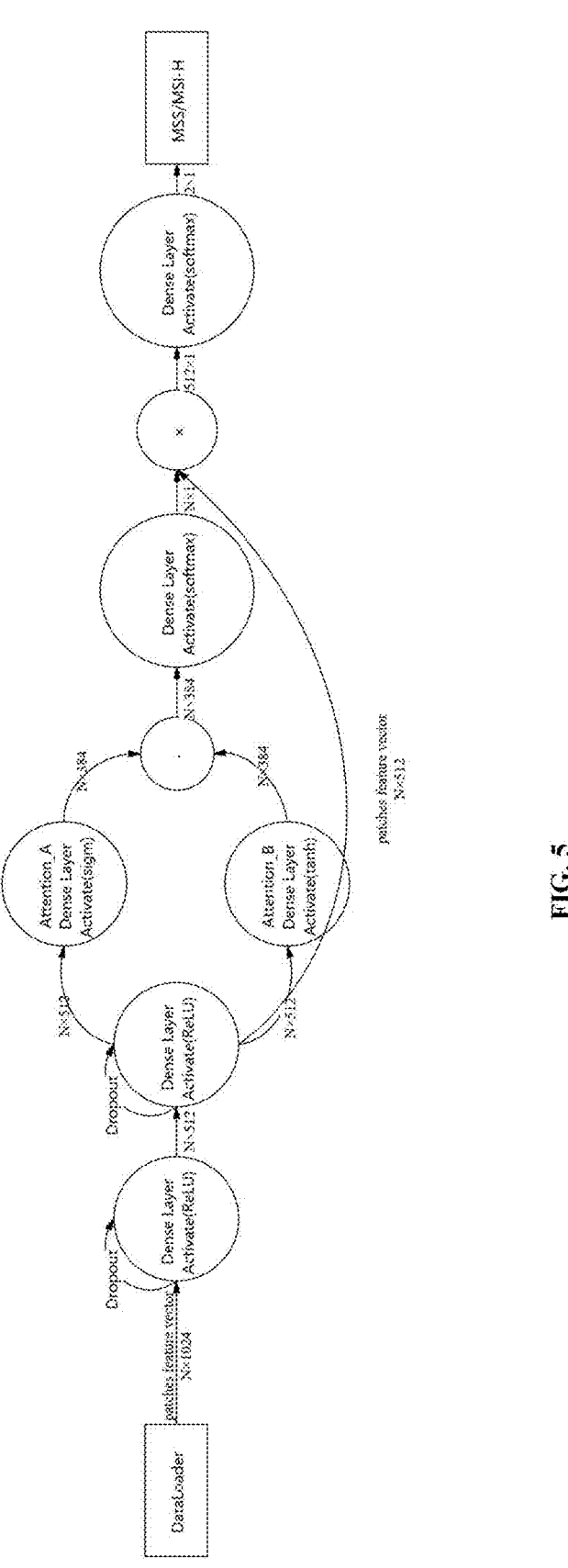
FIG. 5 schematically illustrates a self-attention model according to an embodiment of the present disclosure.

FIG. 5 schematically illustrates the prediction model. The DataLoader inputs the N×1,024 feature matrix to the model. Through two FC layers and a rectified linear unit (ReLU) activation function Dense Layer Activate (ReLU), the 1,024- dimensional feature vector corresponding to each tumor patch is transformed linearly twice and activated by the ReLU to form the 512-dimensional feature vector. The FC layer and the ReLU activation function Dense Layer Activate (ReLU) are used to transform the feature vector linearly from one feature space to another feature space, and allow outputs of a part of neurons to be 0, which can cause sparsity of the network, reduce an interdependent relation between parameters, and relieve the overfitting problem. Further, a Dropout function may further be used in each FC layer and the ReLU activation function Dense Layer Activate (ReLU), such that a part of hidden nodes are disabled randomly according to a certain proportion to relieve the overfitting problem. Then, attention pooling is performed. Attention_A uses the FC layer and the sigmoid activation function, and Attention_B uses the FC layer and the tanh activation function, so as to realize multiplication. Finally, the feature vector is linearly transformed through the FC layer to a feature space having a same dimension, and the weight of the tumor patch is sought through the softmax activation function. N weights are multiplied with N 512-dimensional feature vectors. A weighted sum for all tumor patches is sought to obtain a 512-dimensional feature vector of the whole target whole slide image. The weighted feature vector is linearly transformed from the 512-dimensional feature space to the two-dimensional (2D) feature space through the FC layer and the softmax activation function Dense Layer Activate (softmax). Meanwhile, through the softmax activation function, the probability of each type, namely the MSI score, is obtained.

After the MSI score is obtained, the MSI type of the target whole slide image can be determined. For example, a threshold is preset. If the MSI score is greater than the threshold, the type MSI-H is determined. If the MSI score is less than the threshold, the type MSS is determined. The specific value of the threshold may be set according to experience or an actual condition.

So far, the MSI prediction on the target whole slide image is completed. The present disclosure inputs the feature matrix formed by the feature vectors of all tumor patches to the prediction model of the self-attention mechanism for prediction, computes a weight of each tumor patch, and seeks a weighted sum to obtain the feature vector of the whole target whole slide image, thereby predicting the MSI score. The weight of each tumor patch is determined according to an influence of the tumor patch in the whole target whole slide image, such that the final feature mapping is more accurate.

The prediction model is trained as follows:

a. A plurality of pathological sample images are treated with the method in Steps S1-S4, and N×M feature matrices corresponding to the pathological sample images are obtained to serve as sample feature matrices. The pathological sample images come from MSS and MSI-H tissue samples. For each type, there are 1,000 pathological sample images for example. Each pathological sample image is further labeled with the MSI score. Hence, a corresponding relationship between the sample feature matrices and the MSI scores can be established.

b. The sample feature matrices are divided into a training set, a validation set and a test set. For example, there are 70% of the sample feature matrices in the training set, 10% of the sample feature matrices in the validation set, and 20% of the sample feature matrices in the test set.

c. The training set is trained with the self-attention model shown in FIG. 5, namely the sample feature matrices in the training set are used as an input of the self-attention model, while the MSI scores are used as an output of the self-attention model for model training.

d. The model is optimized through the validation set. A weight of the model is stored in case of a minimum loss.

e. When the loss of the validation set is not reduced for continuous preset rounds (such as 40 rounds), and the number of training rounds is greater than a preset number of rounds (such as 100 rounds), the training is stopped.

f. An accuracy, a recall rate and an AUC of the model are counted with the test set.

In conclusion, the present disclosure predicts the MSI based on deep learning and cellular staining. The method includes the steps of obtaining an image of a tissue region through cellular staining on a tissue sample of a patient to serve as a target whole slide image to be predicted, segmenting the tissue region into tissue patches, and performing stain normalization with staintools; screening out N tumor patches from the tissue patches, and inputting the N tumor patches to a preset feature extraction model; encoding each of the tumor patches as an M-dimensional feature vector, thereby obtaining a N×M feature matrix; and inputting the N×M feature matrix to a pre-trained prediction model, such that the prediction model outputs an MSI score of the target whole slide image. The feature vectors of the tumor patches in the whole slide image are acquired to form the feature matrix, and the feature matrix is input to a self-attention model for prediction. The resulting MSI score takes into account an influence of each tumor patch on the whole target whole slide image. Therefore, the resulting feature mapping of the self-attention model is more accurate, and the MSI prediction has a higher accuracy.

Through test, the prediction with the self-attention model trained in the present disclosure has an accuracy of at least 0.9, while the prediction based on the CNN model in the background art has an accuracy of about 0.86. The test data in comparative experiments are shown in Table 1 and Table 2. Table 1 shows data tested with the method of the present disclosure, in which the average specificity is 0.9333, the average sensitivity is 0.7316, and the average AUC is 0.9072. Table 2 shows data tested with the CNN method, in which the average specificity is 0.8865, the average sensitivity is 0.6526, and the average AUC is 0.8697. As can be seen, the prediction method in the present disclosure has an obviously higher accuracy than the prediction method based on the CNN model.

TABLE 1

|  | 0 | 1 | 2 | 3 | 4 |
|---|---|---|---|---|---|
| MSS specificity | 156/171 0.9123 | 163/171 0.9532 | 165/171 0.9649 | 163/171 0.9532 | 151/171 0.8830 |
| MSI-H sensitivity | 30/38 0.7895 | 25/38 0.6579 | 28/38 0.7368 | 29/38 0.7632 | 27/38 0.7105 |
| AUC | 0.9014 | 0.9092 | 0.9241 | 0.9273 | 0.8738 |

TABLE 2

|  | 0 | 1 | 2 | 3 | 4 |
|---|---|---|---|---|---|
| MSS specificity | 156/171 0.9123 | 148/171 0.8655 | 163/171 0.9532 | 145/171 0.8480 | 146/171 0.8538 |

US 12,561,803 B2

11

TABLE 2-continued

|  | 0 | 1 | 2 | 3 | 4 |
|---|---|---|---|---|---|
| MSI-H | 25/38 | 27/38 | 22/38 | 23/38 | 27/38 |
| sensitivity | 0.6579 | 0.7105 | 0.5789 | 0.6053 | 0.7105 |
| AUC | 0.8812 | 0.8643 | 0.8901 | 0.8526 | 0.8603 |

Figure 6:
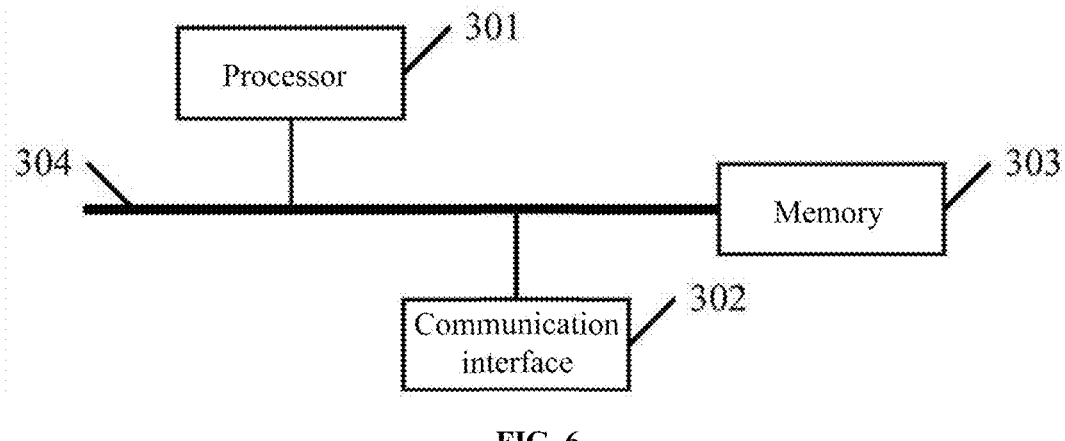
FIG. 6 is a structural view of an electronic device according to an embodiment of the present disclosure.

Based on a same inventive concept, according to the above embodiment on the method for predicting an MSI from a whole slide image based on a self-attention mechanism, the present disclosure further provides an electronic device. As shown in FIG. 6, the electronic device includes a processor 301, a communication interface 302, a memory 303, and a communication bus 304. The processor 301, the communication interface 302, and the memory 303 communicate with each other through the communication bus 304.

The memory 303 is configured to store a computer program.

The processor 301 is configured to execute the program in the memory 303 to implement the following steps:

S1: Acquire a target whole slide image to be predicted, the target whole slide image being an image of a tissue region obtained through cellular staining on a tissue sample of a patient.

S2: Segment the tissue region in the target whole slide image into a plurality of tissue patches having a preset resolution, and perform stain normalization with stain-tools.

S3: Determine tumor probabilities of the tissue patches, and screen out N tissue patches with probabilities satisfying a preset condition to serve as tumor patches.

S4: Input the N tumor patches to a preset feature extraction model, and encode each of the tumor patches as an M-dimensional feature vector, thereby obtaining a N×M feature matrix; and S5: Input the N×M feature matrix to a pre-trained prediction model, such that the prediction model outputs an MSI score of the target whole slide image.

The prediction model is a model obtained by training a self-attention model based on a first sample set. The first sample set includes a feature matrix of a pathological sample image and an MSI score corresponding to the pathological sample image.

The communication bus in the electronic device may be a peripheral component interconnect (PCI) bus, an extended industry standard architecture (EISA) bus, or the like. The communication bus may be classified as an address bus, a data bus, a control bus, or the like. For ease of representation, only one thick line is used to represent the communication bus in the figure, but this does not mean that there is only one bus or only one type of bus.

The communication interface is used for communication between the foregoing electronic device and another device.

The memory may include a random access memory (RAM), or a non-volatile memory (NVM), for example, at least one magnetic disk memory. Optionally, the memory may alternatively be at least one storage apparatus located far away from the foregoing processor.

The processor may be a general-purpose processor, including a central processing unit (CPU), a network processor (NP), or the like; or may be a digital signal processor (DSP), an application-specific integrated circuit (ASIC), a field-programmable gate array (FPGA), another programmable logic device, a discrete gate or transistor logic device, or a discrete hardware component.

By applying the electronic device provided by the present disclosure, the feature vectors of the tumor patches in the whole slide image are acquired to form the feature matrix, and the feature matrix is input to a self-attention model for prediction. The resulting MSI score takes into account an influence of each tumor patch on the whole target whole slide image. Therefore, the resulting feature mapping of the self-attention model is more accurate, and the MSI prediction has a higher accuracy.

Another embodiment of the present disclosure further provides a computer-readable storage medium, which stores a computer program. The computer program is executed by a processor to implement steps of the method for predicting an MSI from a whole slide image based on a self-attention mechanism in the above embodiment.

Another embodiment of the present disclosure further provides a computer program product containing an instruction. When run on a computer, the computer program product allows the computer to execute steps of the method for predicting an MSI from a whole slide image based on a self-attention mechanism in the above embodiment.

Some or all of the functions in the foregoing embodiments may be implemented by software, hardware, firmware, or any combination thereof. When software is used for implementation, the implementation can be performed in a form of a computer program product in whole or in part. The computer program product includes one or more computer instructions. When the computer program instructions are loaded and executed on a computer, the procedures or functions according to the embodiments of the present disclosure are achieved in whole or in part. The computer may be a general-purpose computer, a dedicated computer, a computer network, or another programmable apparatus. The computer instructions may be stored in a computer-readable storage medium or may be sent from a computer-readable storage medium to another computer-readable storage medium. For example, the computer instructions may be sent from a website, computer, server, or data center to another website, computer, server, or data center in a wired (for example, a coaxial cable, an optical fiber, or a Digital Subscriber Line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, a solid state disk (SSD)), or the like.

It should be noted that relational terms herein such as first and second are merely used to distinguish one entity or operation from another entity or operation without necessarily requiring or implying any actual such relationship or order between such entities or operations. In addition, terms "include", "comprise", or any other variations thereof are intended to cover a non-exclusive inclusion, so that a process, a method, an article, or a device including a series of elements not only includes those elements, but also includes other elements that are not explicitly listed, or also includes inherent elements of the process, the method, the article, or the device. Without more restrictions, the elements defined by the sentence "including a . . . " do not exclude the existence of other identical elements in a process, method, article, or device including the elements.

Each embodiment in this specification is described in a related manner, each embodiment focuses on the difference from other embodiments, and the same and similar parts between the embodiments may refer to each other. Particularly for the embodiments on the electronic device, the computer-readable storage medium and the computer program product, since they are basically similar to the embodiment on the method for predicting an MSI from a whole slide image based on a self-attention mechanism, the description is relatively simple, and reference can be made to the descriptions of the embodiment on the method for predicting an MSI from a whole slide image based on a self-attention mechanism.

Although the content of the present disclosure has been described in detail through the aforementioned preferred embodiments, it should be recognized that the above description should not be considered as limiting the present disclosure. Upon reading the aforementioned content, it will be apparent to those skilled in the art that various modifications and alternations to the present disclosure can be made. Therefore, the claimed scope of the present disclosure shall be defined by the appended claims.

What is claimed is:

1. A method for predicting a microsatellite instability (MSI) from a whole slide image based on a self-attention mechanism, comprising the following steps:

S1: acquiring a target whole slide image to be predicted, the target whole slide image being an image of a tissue region obtained through cellular staining on a tissue sample of a patient;

S2: segmenting the tissue region in the target whole slide image into a plurality of tissue patches having a preset resolution, and performing stain normalization with staintools;

S3: determining tumor probabilities of the tissue patches, and screening out N tissue patches with probabilities satisfying a preset condition to serve as tumor patches;

S4: inputting the N tumor patches to a preset feature extraction model, and encoding each of the tumor patches as an M-dimensional feature vector, thereby obtaining a N×M feature matrix; and S5: inputting the N×M feature matrix to a pre-trained prediction model, such that the prediction model outputs an MSI score of the target whole slide image, wherein the prediction model is a model obtained by training a self-attention model based on a first sample set, and the first sample set comprises a feature matrix of a pathological sample image and an MSI score corresponding to the pathological sample image.

2. The method for predicting an MSI from a whole slide image based on a self-attention mechanism according to claim 1, wherein a method that the prediction model predicts the MSI score of the target whole slide image in step S5 comprises:

S51: transforming the M-dimensional feature vector corresponding to the tumor patch into a low-dimensional feature vector;

S52: performing attention pooling on the low-dimensional feature vector corresponding to the tumor patch to obtain a weight of the tumor patch;

S53: seeking a weighted sum for low-dimensional feature vectors corresponding to all of the tumor patches to obtain a low-dimensional feature vector of the whole target whole slide image; and S54: mapping the low-dimensional feature vector of the whole target whole slide image to a classification space, and performing softmax activation to obtain the MSI score.

3. The method for predicting an MSI from a whole slide image based on a self-attention mechanism according to claim 2, wherein the M-dimensional feature vector is a 1,024-dimensional vector, and the low-dimensional feature vector is a 512-dimensional vector.

4. The method for predicting an MSI from a whole slide image based on a self-attention mechanism according to claim 2, wherein in step S51, the M-dimensional feature vector corresponding to the tumor patch is transformed into the low-dimensional feature vector by:

$$h_k = ReLU(W_2(ReLU\ (W_1 Z_k + b_1)) + b_2)$$

wherein, $Z_k$ denotes an M-dimensional feature vector of a kth tumor patch, $h_k$ denotes a low-dimensional feature vector of the kth tumor patch, $W_1$ and $W_2$ denote a weight parameter of a first fully-connected (FC) layer, and $b_1$ and $b_2$ denote a deviation parameter of the first FC layer.

5. The method for predicting an MSI from a whole slide image based on a self-attention mechanism according to claim 2, wherein in step S51, the weight of the tumor patch is obtained by:

$$a_k = \frac{\exp\{W_a(\tanh(Vh_k + c) \odot sigm(Uh_k + d))\}}{\sum_{j=1}^{N} \exp\{W_a(\tanh(Vh_j + c) \odot sigm(Uh_j + d))\}}$$

wherein, $a_k$ denotes a weight of a kth tumor patch, V and U denote a weight parameter of a second FC layer, c and d denote a deviation parameter of the second FC layer, and $h_k$ denotes a low-dimensional feature vector of the kth tumor patch.

6. The method for predicting an MSI from a whole slide image based on a self-attention mechanism according to claim 2, wherein in step S54, the MSI score is obtained by:

$$p = softmax\ (W_{cls} h_{slide} + b_{cls})$$

wherein, p denotes the MSI score, $W_{cls}$ denotes a weight parameter of a third FC layer, $b_{cls}$ denotes a deviation parameter of the third FC layer, and $h_{slide}$ denotes the low-dimensional feature vector of the whole target whole slide image.

7. The method for predicting an MSI from a whole slide image based on a self-attention mechanism according to claim 1, wherein the feature extraction model is a convolutional neural networks (CNN) model with a VGGNet, AlexNet, InceptionNet or ResNet architecture.

8. The method for predicting an MSI from a whole slide image based on a self-attention mechanism according to claim 7, wherein the feature extraction model uses a ResNet50 model.

9. The method for predicting an MSI from a whole slide image based on a self-attention mechanism according to claim 1, wherein the determining tumor probabilities of the tissue patches in step S3 comprises:

inputting the tissue patches obtained in step S2 to a pre-trained classification model, such that the classification model outputs the tumor probabilities and normal probabilities of the tissue patches, wherein the classification model is a model obtained by training CNN based on a second sample set, and the second sample set comprises a plurality of tumor patches and a plurality of normal patches randomly selected from the pathological sample image.

10. The method for predicting an MSI from a whole slide image based on a self-attention mechanism according to claim 9, wherein the classification model uses a ResNet18 model.

11. An electronic device, comprising a processor, a communication interface, a memory, and a communication bus, wherein the processor, the communication interface, and the memory communicate with each other through the communication bus;

Wherein the memory is configured to store a computer program; and the processor is configured to execute the computer program in the memory to implement steps of the method for predicting a microsatellite instability (MSI) from a whole slide image based on a self-attention mechanism according to claim 1.

12. The electronic device according to claim 11, wherein a method that the prediction model predicts the MSI score of the target whole slide image in step S5 comprises:

S51: transforming the M-dimensional feature vector corresponding to the tumor patch into a low-dimensional feature vector;

S52: performing attention pooling on the low-dimensional feature vector corresponding to the tumor patch to obtain a weight of the tumor patch;

S53: seeking a weighted sum for low-dimensional feature vectors corresponding to all of the tumor patches to obtain a low-dimensional feature vector of the whole target whole slide image; and S54: mapping the low-dimensional feature vector of the whole target whole slide image to a classification space, and performing softmax activation to obtain the MSI score.

13. The electronic device according to claim 12, wherein the M-dimensional feature vector is a 1,024-dimensional vector, and the low-dimensional feature vector is a 512-dimensional vector.

14. The electronic device according to claim 12, wherein in step S51, the M-dimensional feature vector corresponding to the tumor patch is transformed into the low-dimensional feature vector by:

$$h_k = \text{ReLU}(W_2(\text{ReLU}(W_1 Z_k + b_1)) + b_2)$$

wherein, $Z_k$ denotes an M-dimensional feature vector of a kth tumor patch, $h_k$ denotes a low-dimensional feature vector of the kth tumor patch, $W_1$ and $W_2$ denote a weight parameter of a first fully-connected (FC) layer, and $b_1$ and $b_2$ denote a deviation parameter of the first FC layer.

15. The electronic device according to claim 12, wherein in step S51, the weight of the tumor patch is obtained by:

wherein, $a_k$ denotes a weight of a kth tumor patch, V and U denote a weight parameter of a second FC layer, c and d denote a deviation parameter of the second FC layer, and $h_k$ denotes a low-dimensional feature vector of the kth tumor patch.

16. The electronic device according to claim 12, wherein in step S54, the MSI score is obtained by:

$$p = \text{softmax}(W_{cls} h_{slide} + b_{cls})$$

wherein, p denotes the MSI score, $W_{cls}$ denotes a weight parameter of a third FC layer, $b_{cls}$ denotes a deviation parameter of the third FC layer, and hslide denotes the low-dimensional feature vector of the whole target whole slide image.

17. The electronic device according to claim 11, wherein the feature extraction model is a convolutional neural networks (CNN) model with a VGGNet, AlexNet, InceptionNet or ResNet architecture.

18. The electronic device according to claim 17, wherein the feature extraction model uses a ResNet50 model.

19. The electronic device according to claim 11, wherein the determining tumor probabilities of the tissue patches in step S3 comprises:

inputting the tissue patches obtained in step S2 to a pre-trained classification model, such that the classification model outputs the tumor probabilities and normal probabilities of the tissue patches, wherein the classification model is a model obtained by training CNN based on a second sample set, and the second sample set comprises a plurality of tumor patches and a plurality of normal patches randomly selected from the pathological sample image.

20. A non-transitory computer-readable storage medium, wherein the non-transitory computer-readable storage medium stores a computer program, and the computer program is executed by a processor configured to implement steps of the method for predicting a microsatellite instability (MSI) from a whole slide image based on a self-attention mechanism according to claim 1.

* * * * *